United States Patent

[11] 3,542,181

| [72] | Inventor | Sidney L. Schell<br>Niles, Michigan |
|---|---|---|
| [21] | Appl. No. | 667,911 |
| [22] | Filed | Sept. 15, 1967 |
| [45] | Patented | Nov. 24, 1970 |
| [73] | Assignee | John M. Dodwell |

[54] CLUTCH BAND
3 Claims, 6 Drawing Figs.

[52] U.S. Cl. .................................................. 192/107;
188/249; 29/470.5
[51] Int. Cl. .................................................. F16d 13/60
[50] Field of Search .................................. 192/107T,
41S, 81

[56] References Cited
UNITED STATES PATENTS

| 3,266,131 | 8/1966 | Mallory et al. | 192/41SX |
| 3,367,466 | 2/1968 | Lang | 192/107T |
| 3,399,749 | 9/1968 | Baule | 192/107T |

*Primary Examiner*—Benjamin W. Wyche, III
*Attorney*—Hill, Sherman, Meroni, Gross & Simpson

ABSTRACT: A band for one-way V-pulley friction devices having an integral key portion made by crimping and reversely bending an end of the band, lancing the overlapping portion to the band and brazing the thus physically aligned portions.

Patented Nov. 24, 1970 3,542,181
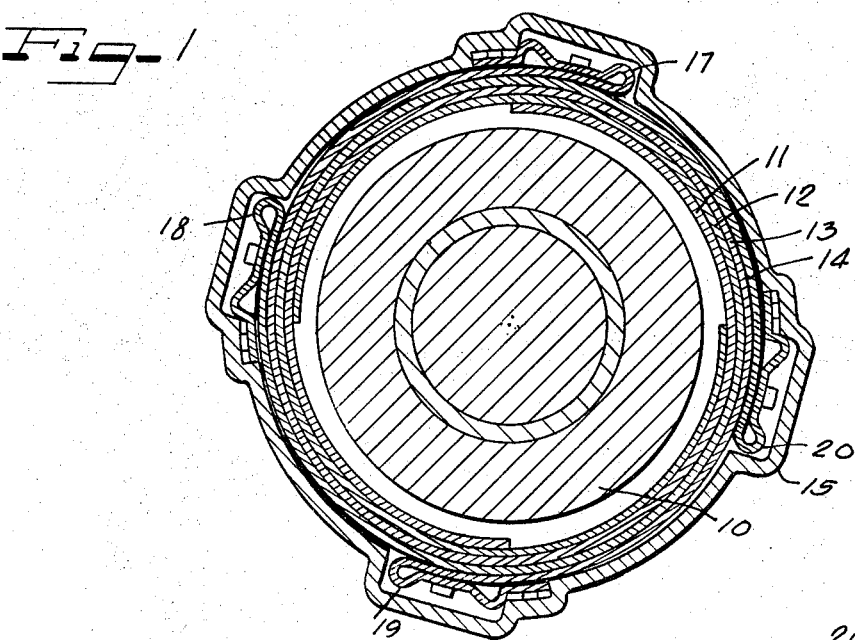
Fig-1
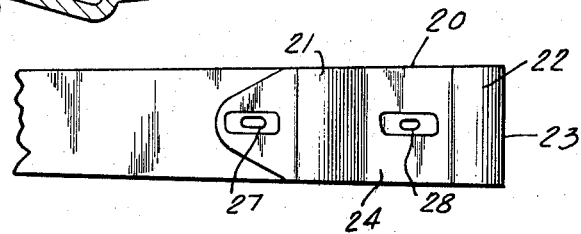
Fig-2
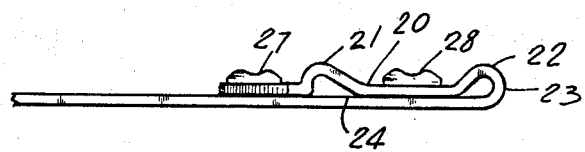
Fig-3
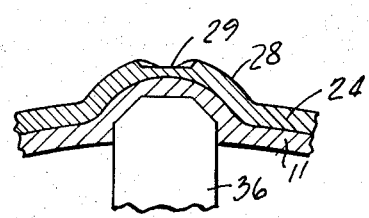
Fig-5
Fig-4
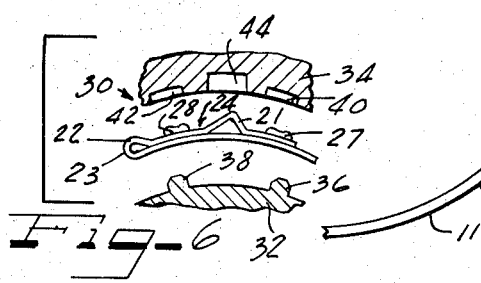
Fig-6
INVENTOR.
SIDNEY L. SCHELL
BY ATTORNEYS

3,542,181

CLUTCH BAND

FIELD OF THE INVENTION

The present invention relates to improvements in the art of free wheeling overrunning clutches and is more particularly concerned with the provision of improved clutch band construction for an overlapping torque transmitting band friction clutch.

It is known to have a clutch employing bands operating in a V-groove to transmit torque between clutching members. The bands act with a wedging action to provide one-way relative rotation between clutching members. If a clutch type device has one of the relatively rotatable members fixed, the device may be termed a one-way brake. On the other hand, when both relatively rotatable components are capable of rotation the device may be more properly termed a clutch. However, it is clear that such a device may be interchangeably used in these fields and to avoid confusion the device hereinafter will be termed a clutch to reflect its control of relative movement and the term is generic as thus used.

Considerable life testing of a band clutch has shown its ability to withstand repeated clutching or braking with very little change in performance and characteristic over its useful life. However, it has been found that clutches of this type are a capable of satisfactory operation for many hundreds of thousands of clutchings beyond the useful life of previously used one-way clutches without failure. When failure has occurred, it generally takes place at the key or securing portion of the band.

SUMMARY

This invention constitutes an improvement in clutch bands and particularly in the key, attachment, portion thereof. Here, the key portion of the band is formed by reversely bending a portion of the band, punching the overlapped portion and the band portion together to provide for precise mechanical alinement and brazing. Thus, alinement is positively fixed by means of a mechanical interlock which prevents misalinement during the heating and cooling phase of brazing. It has been found particularly important to insure critical alinement since if the alinement is inexact, stress concentrations occur in service that seriously limit the service life of the band.

It is accordingly an object of the present invention to provide an improved band for utilization in multiband friction clutches.

Another object of the present invention is to provide an improved clutch band for utilization in an overlapping band clutch.

Another object of the present invention is to provide an improved method of manufacturing a clutch band.

Another object of the invention is to provide a method of forming a brazed load-carrying joint whereby critical alinement is maintained during brazing.

Another object of the present invention is the provision of a band for an overlapping band type one-way clutch capable of substantially indefinite service life without decrease in effectiveness.

Other objects, advantages and capabilities of the invention will become apparent from the following description taken in conjunction with the accompanying drawings showing only a preferred embodiment of the invention.

ON THE DRAWINGS

FIG. 1 is a cross-sectional view of an overlapping band type friction clutch embodying the principles of the present invention;

FIG. 2 is a fragmentary plan view of the clutch band key portion;

FIG. 3 is a fragmentary side elevational view of the clutch band;

FIG. 4 is a fragmentary side view of the clutch band showing the crimping and reverse bending steps;

FIG. 5 is a fragmentary cross-sectional view of the deformed key portion; and

FIG. 6 is a fragmentary side view showing the step of deforming the key portion.

AS SHOWN IN THE DRAWINGS

The principles of this invention are particularly useful when embodied in a clutch band for an overlapping band type clutch as illustrated in FIG. 1. In such an arrangement a pulley 10 seats a plurality of clutch bands 11, 12, 13 and 14 which are keyed by their respective key portions 17, 18, 19 and 20 to the outer housing member 15. In this arrangement, rotation of the pulley member 10 in the counterclockwise direction as viewed in FIG. 1 is prevented while rotation of the member 10 in the clockwise direction relative to the housing 15 is readily permitted by slight expansion action of the bands.

The operation of the clutch as above described is conventional. Each of the bands 11, 12, 13 and 14 is tapered along its length and formed into a helical coil. Due to the inherent resiliency of the clutch bands, they snugly engage side walls (not shown) of the pulley 10. Torque is transmitted between the bands and the housing 15 by way of the torque transmitting surfaces or key portions 17, 18, 19 and 20.

In the improved construction of the present invention, each of the bands 11—14 is crimped to form two surfaces 21, 22 and then reversely bent over at its outer end 23 in a smooth radius bend. The bent-over portion 24 is returned to position of contact with the body of the band 14 to form the torque transmitting key portion 20. The bent-over portion 24 and the band 14 are lanced or punched together to form two mechanically interlocked projections 27, 28 to insure positive physical alinement during brazing. This provides a rigid securement of the key 20. The body of the band 14 and the bent-over portion 24 are held by a combined mechanical and metallic connection. The mechanical interlock 27, 28 permanently deforms the band 14 and bent-over portion 24.

A slight taper is given the completed band along the length of the band to permit its spirally wrapping into contact with the edges of the V-groove of pulley 10.

Thus, the band 14 is preferably a thin spring metal strip which has been precurved along its length into a generally flat radial spiral shape. It is tapered in width along its length from adjacent its outer end 23 to its inner end to provide a pair of progressively closer side edges for progressively deeper cooperation with the V-pulley 10.

FIGS. 4—6 disclose steps which may be used in the manufacture of the clutch bands 11—14. The precurved band 14 is first crimped to form projections 21 and 22 and then reversely bent in a smooth radius bend 23 to form a bent-over portion 24 which contacts the body of the clutch band 14. At this position, the band 14 and the bent-over portion 24 are in exact alinement. A die 30 is used to punch or forge the band 14 to provide a mechanical interlock in the key portion 20 at positions 27 and 28 simultaneously. The die 30 is composed of a male and female member 32, 34 respectively having punching projections 36, 38 and corresponding female portions 40, 42 which permanently deform the band 14 and bent-over portion 24. The female die 34 which is shown in section has a cutout 44 which runs the width of the die to receive the crimped projection 21 of the bent-over portion 24.

The punching operation is best illustrated in FIG. 5 wherein the punch 36 projects into the band 11. The projection 28 on the bent-over portion 24 is formed from layers of the band 11 and bent-over portion 24 which are permanently deformed from their original configuration. A recess 29 results from a centering projection in the female portion 40, or by staking of the interlock 28.

Metallic joining by brazing is then used to metallically fix the bent-over portion 24 to the band 14. Alternative means of metallic fixing may be used such as soldering or welding.

It can thus be seen that exact alinement of the band 14 with respect to the key portion 20 is provided. This positive alinement provides exact final configuration and insures long service life. It will further be observed that the mechanical interlock, employed during manufacture, also acts during use to supplement the brazed bond and to thereby increase the strength of the band under loads applied to the key in clutching use. In addition, the mechanical interlock may be by lancing and/or staking.

Various modifications may be made in the invention without departing from the spirit and scope thereof. It is desired, therefore, that only such limitation shall be placed thereon as are imposed by the prior art and are set forth in the appended claims.

I claim:

1. In a band for a one-way V-pulley friction device having an elongated thin spring metal strip precurved into a generally flat radial spiral shape, tapered in width along its length from adjacent its outer end to its inner end to provide a pair of progressively closer side edges for progressively deeper cooperation with the sidewalls of the V-pulley, the improvement comprising securing means on the strip adjacent its outer end including a key portion composed of a reversely bent-over portion of said band which is first fixed to said band by an intimately mating mechanical interlock and then by a metallic bond, said mechanical interlock including interlocking means which positively prevents both relative circumferential and axial movements between the bent-over portion and the remainder of the band.

2. A band for a friction device as recited in claim 1 wherein the reversely bent portion is mechanically interlocked to said band by punching both the band and said reversely bent portion to permanently deform both the band and said reversely bent portion into intimate contact throughout the deformed area.

3. A band for a friction device as recited in claim 1 wherein said metallic bond comprises a brazed joint.